US012783694B2

(12) United States Patent
Young de la Sota

(10) Patent No.: US 12,783,694 B2
(45) Date of Patent: Nov. 3, 2026

(54) SIDE CHANNEL RESISTANT MEMORY OPERATIONS

(71) Applicant: Google LLC, Mountain View, CA (US)

(72) Inventor: Miguel Cristian Young de la Sota, Cambridge, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/835,569

(22) PCT Filed: Feb. 1, 2023

(86) PCT No.: PCT/US2023/012116
§ 371 (c)(1),
(2) Date: Aug. 2, 2024

(87) PCT Pub. No.: WO2023/150165
PCT Pub. Date: Aug. 10, 2023

(65) Prior Publication Data

US 2025/0131107 A1 Apr. 24, 2025

Related U.S. Application Data

(60) Provisional application No. 63/305,898, filed on Feb. 2, 2022.

(51) Int. Cl.
*G06F 21/60* (2013.01)
*G06F 21/55* (2013.01)

(52) U.S. Cl.
CPC .......... *G06F 21/602* (2013.01); *G06F 21/556* (2013.01)

(58) Field of Classification Search
CPC .............................. G06F 21/602; G06F 21/556
See application file for complete search history.

(56) References Cited

U.S. PATENT DOCUMENTS

| | | | | |
|---|---|---|---|---|
| 2008/0133629 | A1 | 6/2008 | Stribaek et al. | |
| 2008/0282073 | A1* | 11/2008 | Cabot | G06F 7/02 712/300 |
| 2015/0293826 | A1* | 10/2015 | Sincan | H04L 43/50 714/712 |

(Continued)

OTHER PUBLICATIONS

Stackoverflow, "memcpy with startIndex?", https://stackoverflow.com/questions/1163624/memcpy-with-startindex, 2009 (Year: 2009).*

(Continued)

*Primary Examiner* — Hee K Song
(74) *Attorney, Agent, or Firm* — Fish & Richardson P.C.

(57) ABSTRACT

Methods, systems, and apparatus, including computer programs encoded on computer-storage media, for privacy preserving digital component provider. In some implementations, a method includes accessing a buffer including one or more sets of bits; generating a random sequence of values; generating, from the random sequence of values, a sequence of indices representing an order in which to access particular sets of bits of the buffer; in response to determining an index of the sequence of indices corresponds to a location in the buffer, accessing a set of the particular sets of bits of the buffer at the index in the order of the sequence of indices; and performing one or more memory operations on the set of the one or more sets of bits after accessing the set.

19 Claims, 5 Drawing Sheets

(56) References Cited

U.S. PATENT DOCUMENTS

| | | | | |
|---|---|---|---|---|
| 2016/0140340 | A1 | 5/2016 | Walters et al. | |
| 2019/0361815 | A1* | 11/2019 | Tsirkin | G06F 12/1036 |
| 2020/0184113 | A1 | 6/2020 | Doll et al. | |
| 2020/0401733 | A1 | 12/2020 | Leiserson et al. | |
| 2022/0141011 | A1* | 5/2022 | Kaplan | G06F 7/588 380/44 |

OTHER PUBLICATIONS

Brejon et al., "Fault attack vulnerability assessment of binary code," Paper, Presented at CS2 '19: Proceedings of the Sixth Workshop on Cryptography and Security in Computing Systems, Valencia, Span, Jan. 21, 2019, 6 pages.

Github.com [online], "opentitan-1/hardened_memory.c," Apr. 6, 2022, retrieved on May 4, 2023, Retrieved from URL <https://github.com/mcy/opentitan-1/blob/4cb4511c783e1555c5bbee4096bd91de81097da4/sw/device/lib/base/hardened_memory.c>, 4 pages.

Github.com [online], "Opentitan-1/random_order.h at secure-mem," Apr. 6, 2022, retrieved on May 4, 2023, Retrieved from URL <https://github.com/mcy/opentitan-1/blob/secure-mem/sw/device/lib/base/random_order.h>, 3 pages.

International Preliminary Report on Patentability in International Appln. No. PCT/US2023/012116, mailed on Aug. 15, 2024, 10 pages.

International Search Report and Written Opinion in International Appln. No. PCT/US2023/012116, mailed on May 15, 2023, 19 pages.

Kamal et al., "An area-optimized implementation for AES with hybrid countermeasures against power analysis," Paper, Presented at the 2009 International Symposium on Signals, Circuits and Systems, Iasi, Romania, Jul. 9-10, 2009, 4 pages.

Patrick, "Software protection against fault and side channel attacks," Thesis for the degree of Masters of Science in Computer Engineering, Virginia Polytechnic Institute and State University, Jun. 2017, pp. 1-77.

Shelton et al., "ROSITA: Towards automatic elimination of power-analysis leakage in ciphers," Paper, Presented at the Network and Distributed Systems Security (NDSS) Symposium 2021, Virtual Conference, Feb. 21-24, 2021, pp. 1-17.

Tillich et al., "Protecting AES Software Implementations on 32-Bit Processors Against Power Analysis," Paper, Presented at the International Conference on Applied Cryptography and Network Security, Zhuhai, China, Jun. 5-8, 2007, pp. 141-157.

Veshchikov et al., "Variety of scalable shuffling countermeasures against side channel attacks," Journal of cyber security and mobility, Jan. 2017, 5(3):195-232.

Veyrat-Charvillion et al., "Shuffling Against Side-Channel Attacks: A Comprehensive Study with cautionary Note," Paper, 18th International Conference on the Theory and Application of Cryptology and Information Security, Beijing, China, Dec. 2-6, 2012, 19 pages.

Werner et al., "Scattercache: Thwarting Cache Attacks via Cache Set Randomization," Paper, Presented at the 28th USENIX Security Symposium, Santa Clara, CA, Aug. 14-16, 2019, pp. 675-692.

wikipedia.org [online], "Hardware random number generator," Nov. 30, 2021, retrieved on Nov. 27, 2024, retrieved from URL <https://en.wikipedia.org/w/index.php?title=Random_number_generation&oldid=1057892596r>, 10 pages.

Office Action in Indian Appln. No. 202447065663, mailed on Sep. 11, 2025, 11 pages.

Office Action in Japanese Appln. No. 2024-545979, mailed on Aug. 19, 2025, 4 pages (with English translation).

Notice of Grant in Japanese Appln. No. 2024-545979, mailed on Apr. 7, 2026, 5 pages (with English translation).

Office Action in Korean Appln. No. 10-2024-7028219, mailed on Jul. 14, 2026, 6 pages (with English translation).

* cited by examiner

SIDE CHANNEL RESISTANT MEMORY OPERATIONS

CROSS-REFERENCE TO RELATED APPLICATION

This application is a National Stage Application under 35 U.S.C. § 371 and claims the benefit of International Application No. PCT/US2023/012116, filed Feb. 1, 2023, which claims priority to U.S. application Ser. No. 63/305,898, filed Feb. 2, 2022, the disclosure of which is incorporated herein by reference.

TECHNICAL FIELD

This specification generally relates to memory operations, e.g., that achieve a similar purpose to memcpy, memcmp, and memset, that are resistant, e.g., to fault and power attacks and that are generally platform independent.

BACKGROUND

Compilers and C programmers alike make use of three basic memory operations: memcpy (for moving bytes), memset (usually for clearing memory) and memcmp (mostly for compare and evaluating equality of memory regions). However, implementations of these operations (as provided in most compilers) can be fragile against power analysis, among other methods of hacking or tampering. Generally, power analysis can include techniques for studying the power consumption of a device as it executes operations or computations, such as cryptographic algorithms among others. To perform these executions requires a certain amount of computational power which can result in a unique power consumption pattern. By measuring the power consumption of a device as it performs executions, an attacker can infer information involved in the executions—e.g., secret keys in the case of cryptographic algorithms. Attackers can use information to break encryption or gain access to protected data. Similar analyses can be performed by monitoring the time for computing based on input provided to a device. Timing or power can be leaked so as to inform an attacker of underlying information.

For example, memcpy and memcmp manipulate memory in-order at the byte level, making them susceptible to Hamming weight (HW) model power attacks. The function memcmp can leak the size of the largest prefix the two buffers share. The function memset generally does not leak much data, but since it writes a long string of zeroes, it can have a distinct power signature that can be used as a timing source by an attacker.

Although memcmp leakage is a well-known problem that constant-time cryptographic code attempts to address it may still leak memory information and may still be vulnerable to power analysis, among other attack methods known in the art, as discussed. Although various solutions exist, they generally rely on the behavior of the hardware and assumptions on how specific compilers work. No mitigation is generally designed to be platform independent—i.e., to be reusable across platforms. Existing solutions also frequently make use of volatile memory operations, which are significant optimization barriers, much stronger, and potentially less efficient than what may be actually necessary.

SUMMARY

One innovative aspect of the subject matter described in this specification is embodied in a method that includes accessing a buffer including one or more sets of bits; generating a random sequence of values; generating, from the random sequence of values, a sequence of indices representing an order in which to access particular sets of bits of the buffer; in response to determining an index of the sequence of indices corresponds to a location in the buffer, accessing a set of the particular sets of bits of the buffer at the index in the order of the sequence of indices; and performing one or more memory operations on the set of the one or more sets of bits after accessing the set.

Other implementations of this and other aspects include corresponding systems, apparatus, and computer programs, configured to perform the actions of the methods, encoded on computer storage devices. One such implementation is a non-transitory computer-readable medium storing one or more instructions executable by a computer system to perform the actions of the methods. A further such implementation is embodied in a system comprising one or more processors and machine-readable media interoperably coupled with the one or more processors and storing one or more instructions that, when executed by the one or more processors, perform the actions of the methods. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, generating the random sequence of values includes: obtaining a value from entropy delivery hardware; and generating values from a number generator with the value from the entropy delivery hardware as a starting key.

In some implementations, actions include providing one or more requirements to the number generator, where the one or more requirements include one or more values representing portions of the buffer.

In some implementations, generating the sequence of indices from the random sequence of values representing the order in which to access particular sets of the one or more sets of bits of the buffer includes: adding a value of the random sequence of values to a memory offset value corresponding to a starting memory location of the buffer.

In some implementations, performing one or more memory operations includes: copying bits to, or from, the buffer. In some implementations, performing one or more memory operations includes: resetting bits in the buffer to random or 0 bits. In some implementations, performing one or more memory operations includes: comparing bits of the buffer to bits of a second buffer.

In some implementations, actions include: accessing the second buffer including one or more sets of bits; and accessing a second set of bits of the second buffer in the order of the sequence of indices.

In some implementations, accessing the set of the particular sets of bits of the buffer at the index in the order of the sequence of indices includes: accessing a portion of the buffer corresponding to the index, where the portion includes the set of the particular sets of bits.

In some implementations, determining the index of the sequence of indices corresponds to a location in the buffer includes: determining the index of the sequence of indices corresponds to the set of the particular sets of bits of the buffer.

In some implementations, actions include: determining a second index of the sequence of indices does not correspond to one or more bits of the buffer; and based on determining the second index of the sequence of indices does not correspond to one or more bits of the buffer, accessing one or more bits and performing a decoy operation on the one or more bits.

Advantageous implementations can include one or more of the following features. Techniques described can enable memory operations to occur on a processing device without leaking information sufficient for a hacker or other user to obtain sensitive information. Techniques described can ensure that given input data is processed out of order relative to the input bits such that the same input data can produce different power traces when processed more than one time—e.g., to thwart power analysis attacks as discussed in this document. Techniques described can include a random number engine that generates indices of bit sets to process. The random number engine can generate sufficient indices such that all bits of input data are processed but some parts of the input data can be processed more than once and some data not included in the input data, e.g., decoy data, can be processed for indices generated by the random number engine that are not included in the input data. This form of obfuscation can effectively thwart hacking attacks while maintaining processing efficiency—e.g., unlike more intensive security measures that involve volatile memory operations.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
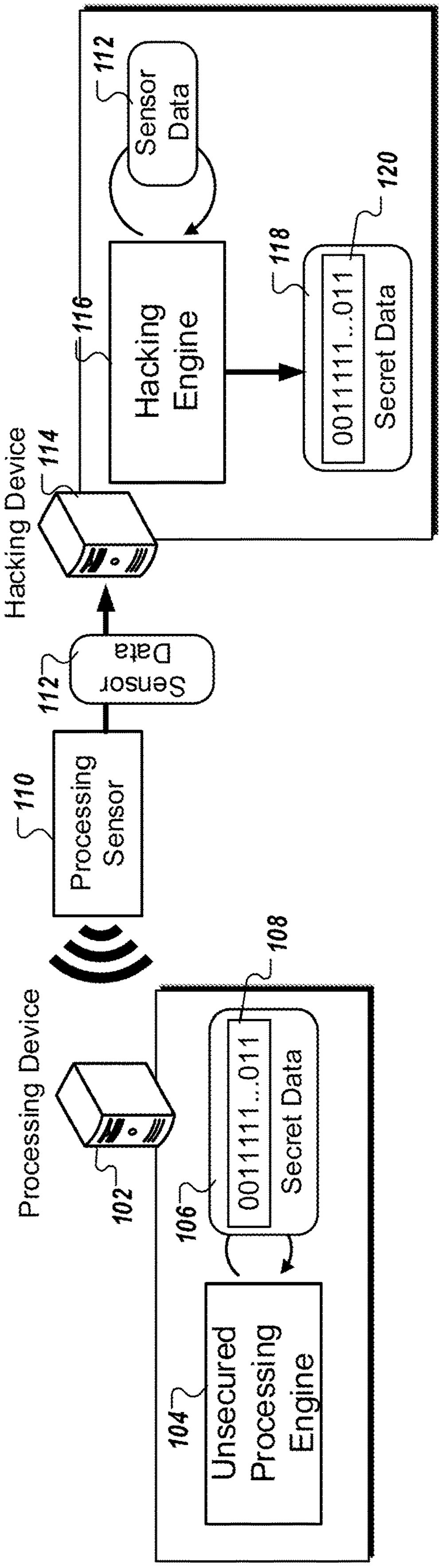
FIG. 1 is a diagram showing an example of a hacking device gaining access to secret data being processed on the processing device that uses an unsecured memory operation.

First, a problem with existing memory operations is shown in FIG. 1. Then, the proposed techniques to alleviate this problem among others is shown and described in reference to FIGS. 2-4. In general, traditional implementations of memory operations of a computer (such as memcpy, memset, or memcmp) potentially expose information that can be interpreted by hackers to reconstruct secret or otherwise sensitive data being processed, as shown in FIG. 1. The techniques described in reference to FIGS. 2-4 help to alleviate this information leakage.

FIG. 1 is a diagram showing an example of a hacking device 114 gaining access to secret data 106 being processed on the processing device 102 that uses an unsecured memory operation. The processing device 102 can include one or more processors configured to execute operations of an unsecured processing engine 104. The unsecured processing engine 104 can perform processes of an unsecured memory operation, such as a traditional implementation of memcpy, memset, or memcmp.

A processing sensor 110 communicably connected to the hacking device 114 senses operations of the processing device 102, e.g., through electromagnetic radiation, magnetic field, power drawn by the processing device 102, among others. The processing sensor 110 generates sensor data 112, which can include data representing an amount of electromagnetic radiation emitted, over time, from the processing device 102 as it processes the secret data 106, which may be secret as a cryptographic key or may be sensitive personal data, among others.

The hacking device 114 obtains the sensor data 112 generated by the processing sensor 110 and provides the sensor data 112 to the hacking engine 116. The hacking engine 116 can include one or more hardware processors programmed with computer-readable instructions to receive sensor data 112 and process the sensor data 112 to generate secret information. The hacking device 114 can monitor the processing device 102 over a period of time and collect sensor data for multiple processing runs of the processing device 102. The hacking engine 116 of the hacking device 114 can generate the secret data 118 represented as bit values 120. This secret data can be the same or a sufficiently similar copy of the secret data 106. In some implementations, multiple processing runs are used to determine how different input effects a given power analysis or timing analysis which can be used—e.g., by a trained machine learning model—to generate a copy or a sufficiently similar copy of the secret data 106. Overtime, the hacking engine 116 can generate secret data 118 that is an exact copy of the secret data 106 thereby exposing the sensitive information or expositing a cryptographic key and making resulting cryptographic security ineffectual.

Figure 2:
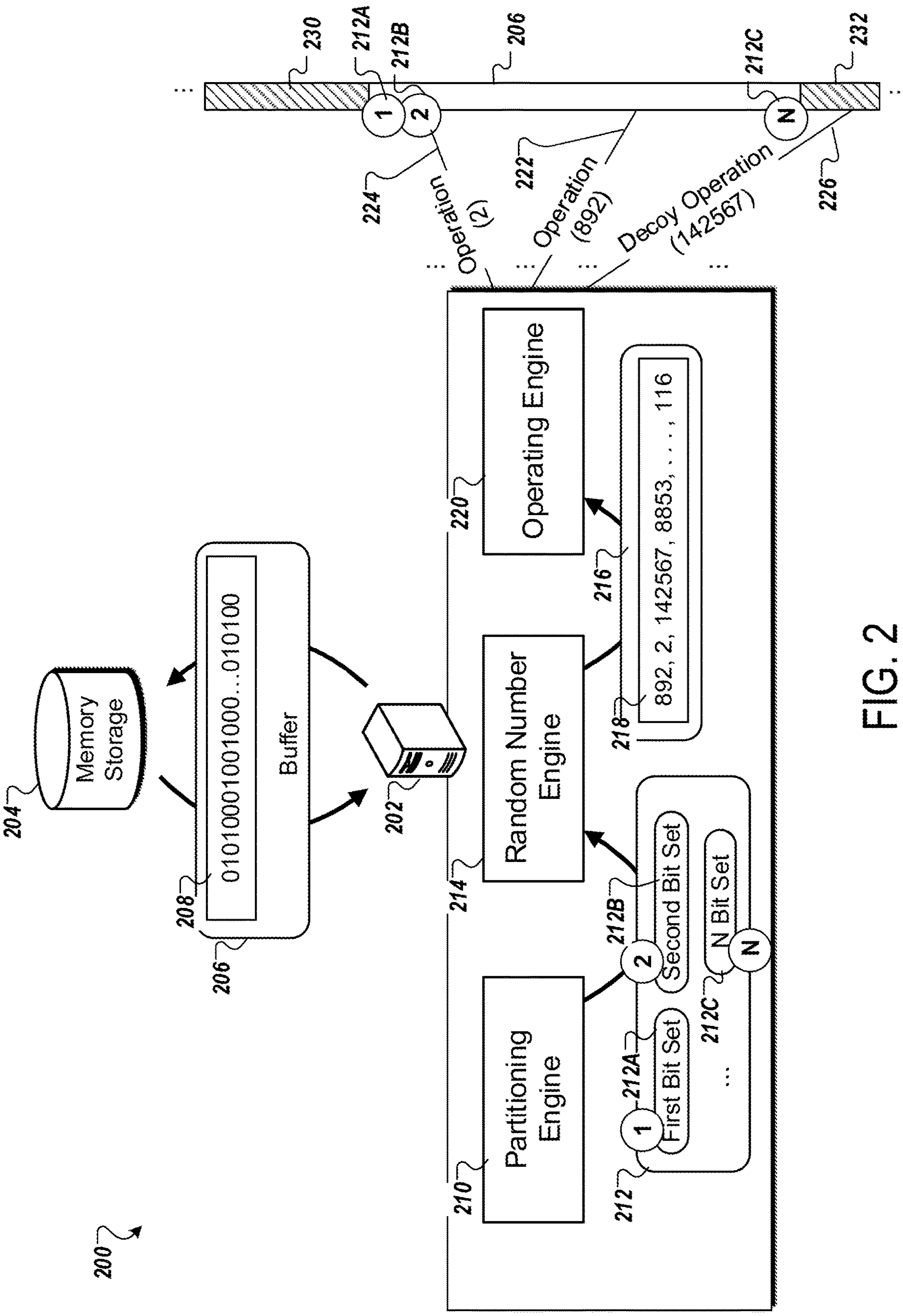
FIG. 2 is a diagram showing an example of a system for resistant memory operation.

FIG. 1 shows how unsecured processes can leak information for a hacking device to use in determining secret information being processed. FIGS. 2-4 illustrate proposed techniques to alleviate this problem among others.

FIG. 2 is a diagram showing an example of a system 200 for resistant memory operation. The system 200 includes an operating device 202 that modifies data stored in memory storage 204 in such a way as to prevent information leakage, e.g., to a hacking device such as the hacking device 114 of FIG. 1. The system 200 includes the memory storage 204, e.g., hardware configured to store bits. The memory storage 204 can include one or more connected devices. The memory storage 204 can be included within hardware of the operating device 202 or be included in hardware of a device communicably connected to the operating device 202. Elements, such as the memory storage 204 and the operating device 202 can exchange information using one or more wired or wireless connections.

The operating device 202 operates a partitioning engine 210, a random number engine 214 (also referred to as a number generator, or random number generator), and an operating engine 220. The partitioning engine 210 partitions data from buffer 206 of the memory storage 204. The random number engine 214 generates a sequence of random numbers, or pseudo random numbers, 216 (also referred to as a random sequence of values). The operating engine 220 uses the random numbers 216 as indices to operate on the partitioned bits determined by the partitioning engine 210. Operations can include copying bits, resetting bits—e.g., to 0 or to other values, or comparing bits—e.g., determining if a sequence of 0s and 1s are equal to another sequence of 0s and 1s.

In some implementations, the operating device 202 accesses one or more other buffers stored in the memory storage 204. For example, the operating device 202 can access the buffer 206 for resetting, copying, or comparing bits 208 of the buffer 206. In instances of comparing bits 208 to other bits in another buffer, the operating device 202 can access that other buffer. Similar to the buffer 206, the operating device 202 can use indices generated based on the random number engine 214 to compare elements of two or more buffers. For example, when comparing buffers, the same random number of a sequence generated by the random number engine 214 can be used to obtain a string of bits from the two or more buffers being compared. Portions of the buffer can be compared in this way until all portions of the buffer have been accessed and compared. In some implementations, the operating engine 220 uses XOR operations to determine whether, based on multiple comparisons of portions of two or more buffers, whether the entire two or more buffers are the same or different.

In some implementations, the random number engine 214 generates indices that represent locations in the buffer 206. For example, the operating engine 220 can obtain the random numbers 216 and directly use the random numbers 216 to operate on corresponding locations in the buffer 206. In some implementations, the random number engine 214 generates indices that represent values. For example, the operating engine 220 can generate indices using the values of the random numbers 216, e.g., the values 218, to generate memory location identifiers. The values can be offset values from a given starting location in memory of the buffer 206.

In general, the random number engine 214 is configured to generate values that can be used to cover all indices of a given buffer. The random number engine 214 is configured to generate values outside of a length corresponding to a given buffer. For example, the buffer 206 can include 16000 bits corresponding to 500 sets of 32 bits. The sets of 32 bits can be referenced using an index value, e.g., 0-499 or 1-500, among others. The random number engine 214 can generate values between min and max indices—e.g., 0-499—and values outside of these bounds. The values outside of the bounds can be used to obfuscate any would be hacking system by adding random processing noise to the processing of the operating device 202. Values corresponding to indices outside the bounds of a given buffer can initiate decoy processes by the operating device 202 which could be detected in power or timing analysis by a hacker and increase errors in any subsequent hacker predictions of secret information. Similarly, a given buffer can be processed when all indices are processed but the order is not necessarily determined beforehand and can change in subsequent processing rounds for the same buffer or input data. In this way, the power or timing profile of the operating device 202 sensed by a hacking device—e.g., hacking device 114—can change even for the same input thereby further obfuscating and frustrating a would be hacking system from attempting to obtain sensitive information.

The following describes example cases of copying, resetting, and comparing bits using the system 200 shown in FIG. 2. Further description can be found in the included pseudocode.

Memory Copying Operation

For an example case of copying, the operating device 202 obtains the buffer 206 including the bits 208 from the memory storage 204 and determines one or more portions of the buffer 206. The operating device 202 can duplicate one or more bits of the buffer 206 in another memory location or duplicate one or more bits from another memory location to the buffer 206. The partitioning engine 210 can determine one or more sets of bits 212, e.g., 212A-C. Sets of bits can include words, e.g., 32-bit sets.

The random number engine 214 generates a sequence of random values 216. An example sequence is shown in 218 as "892, 2, 142567, 8853, . . . , 116." The operating engine 220 obtains the values 216 and performs operations on portions of the buffer 206. For the present example, the operation includes copying the bits of the buffer 206 to another location. The other location can be another buffer accessed from the memory storage 204 or other memory storage device connected to the operating device 202.

The operating engine 220 determines a first index based on a first value of the values 216. The operating engine 220 uses the first index to operate on a first portion of the buffer 206. In the present example, the first value is 892. The operating engine 220 performs operation (892) 222 on a portion of the buffer 206 corresponding to a value of 892. The portion can be the $892^{nd}$ index of the buffer 206 or the $892^{nd}$ bit of the buffer 206 or some other value generated based on the value 892. Because the value 892 corresponds to a location in the buffer 206, an actual operation is performed by the operating engine 220 and not a decoy operation.

The operating engine 220 determines a second index. The operating engine 220 performs operation (2) 224 on a portion of the buffer 206 corresponding to a value of 2. Similar to the value 892, the portion corresponding to the value 2 can be the $2^{nd}$ index of the buffer 206 or the 2nd bit of the buffer 206 or some other value generated based on the value 2. Because the value 2 corresponds to a location in the buffer 206, an actual operation is performed by the operating engine 220 and not a decoy operation.

The operating engine 220 determines a third index. The operating engine 220 performs decoy operation (142567) 226 on a portion of the buffer 206 corresponding to a value of 142567. Similar to the value 892 and 2 described above, the portion corresponding to the value 142567 can be the 142567th index of the buffer 206 or the 142567th bit of the buffer 206 or some other value generated based on the value 142567.

Unlike the values 892 and 2 that correspond to locations in the buffer 206, the value 142567 does not correspond to a location in the buffer 206. As a result, the operating engine 220 performs a decoy operation. Compared to operations 222 and 224, the decoy operation (142567) 226 can be random and can take up processing power by the operating device 202 without performing an actual memory copying action (e.g., of copying data from a source buffer to a destination buffer). For example, in this scenario, the operating device 202 can access data outside the buffer 206 and copy existing data to the same location or access unused memory and shift the bits by one or more bits in memory among other possible decoy operations.

Memory Resetting Operation

For an example case of memory resetting, core elements of access of a given buffer—e.g., the buffer 206—can be the same as those elements described in reference to the copying operation. Instead of copying from a source to a destination, the operating engine 220 can use the values generated by the random number engine 214 to determine one or more portions of the buffer 206 to reset to 0 or other randomized values. Similar indices can be generated for particular parts of the buffer 206. The operating engine 220 can access portions of the buffer using indices generated from the random values 216 generated by the random number engine 214.

For operations within the buffer—e.g., operations 222 or 224—the operating engine 220 can reset corresponding portions of the buffer to 0 or other randomized values. For example, the operating engine 220 can determine a first index based on the value 892 as described in reference to the copying operation. The operation (892) can include resetting one or more bits at a location of the buffer 206 corresponding to the value 892 instead of an operation for copying that include copying from a source to a destination—where the buffer 206 can be either the source or destination.

Similar resetting operation can be performed by the operating engine 220 for the operation 224. For the decoy operation 226, the operating engine 220 can perform a decoy operation—e.g., resetting values to the same values or moving bits in unused memory locations by a specific value. In this way, data leakage by power consumption or time of execution by the operating device 202 can be reduced for a memory resetting operation.

Memory Comparing Operation

For an example case of comparing, the preliminary steps for a given access of a buffer—e.g., the buffer 206—can be similar to the operations for copying and resetting. The operations performed by the operating engine 220, however, can be different. In some implementations, the operating device 202 accesses a second buffer to compare with the buffer 206. The partitioning engine 210 can determine one or more sets of bits for both the buffer 206 and the other buffer to be compared with the buffer 206. Although two buffers are discussed, the same operations can be applied to more than two buffers for comparing more than two buffers.

The random number engine 214 can again generate random values—e.g., values 216—that are used by the operating engine 220. In the comparing operation, the operating engine 220 can access values in both the buffer 206 and a buffer being compared with the buffer 206. For example, the operating engine 220 can access a portion of the buffer 206 corresponding to the value 892 from the values 216 and compare it with a number of bits at a location corresponding to the same value 892 in the other buffer being compared. For values that do not correspond to values within the buffer 206 or the buffer being compared, the operating engine 220 can generate a result that is equivalent to a comparing matching result. In some implementations, XOR methods are used by the operating engine 220 to determine whether one or more portions of two or more buffers are the same. The result of comparing operations based on values generated by the random number engine 214 outside the bounds of the buffer 206 or a buffer being compared can be 0 in the XOR case. The operating engine 220 can store all results of XOR operations between portions of the buffer 206 and portions of one or more buffers being compared. If an OR operation performed by the operating engine 220 on all stored XOR results is equal to 0, the operating engine 220 provides a result for storage, display, or subsequent operations that the two or more buffers are the same. By ensuring that decoy operations provide an XOR result of 0, the system 200 for comparing can ensure that the decoy operations serve their obfuscation purposes without affecting the underlying comparison of the two or more buffers.

In some implementations, the operating engine 220 performs operations on the portions determined using the random values 216 sequentially. Operations can include any of the copying, resetting, or comparing operations discussed in this document. In some implementations, the operating engine 220 performs one or more operations in parallel. For example, the operating engine 220 can include two or more processors that process one or more buffers corresponding to portions of the values generated by the random number engine 214. In an example case, two processors of the operating engine 220 can each receive half of the values 216—e.g., from index 0 to the length of the values 216 divided by two (i.e., the total number of processors) to a first processor and subsequent values and corresponding portions to be processed to subsequent processors.

Figure 3A:
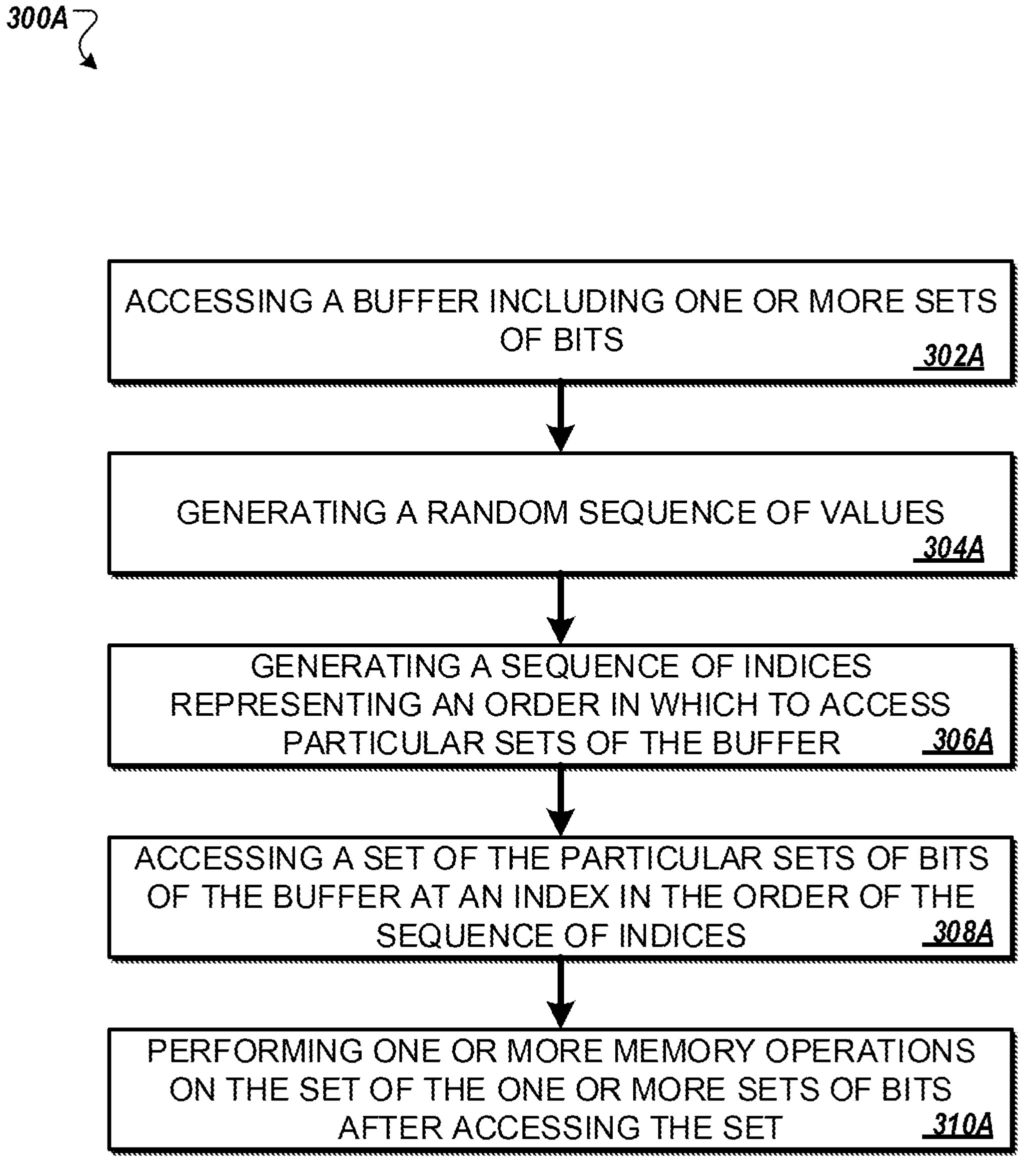
FIG. 3A is a flow diagram illustrating an example of a process for resistant memory operation.
Figure 4:
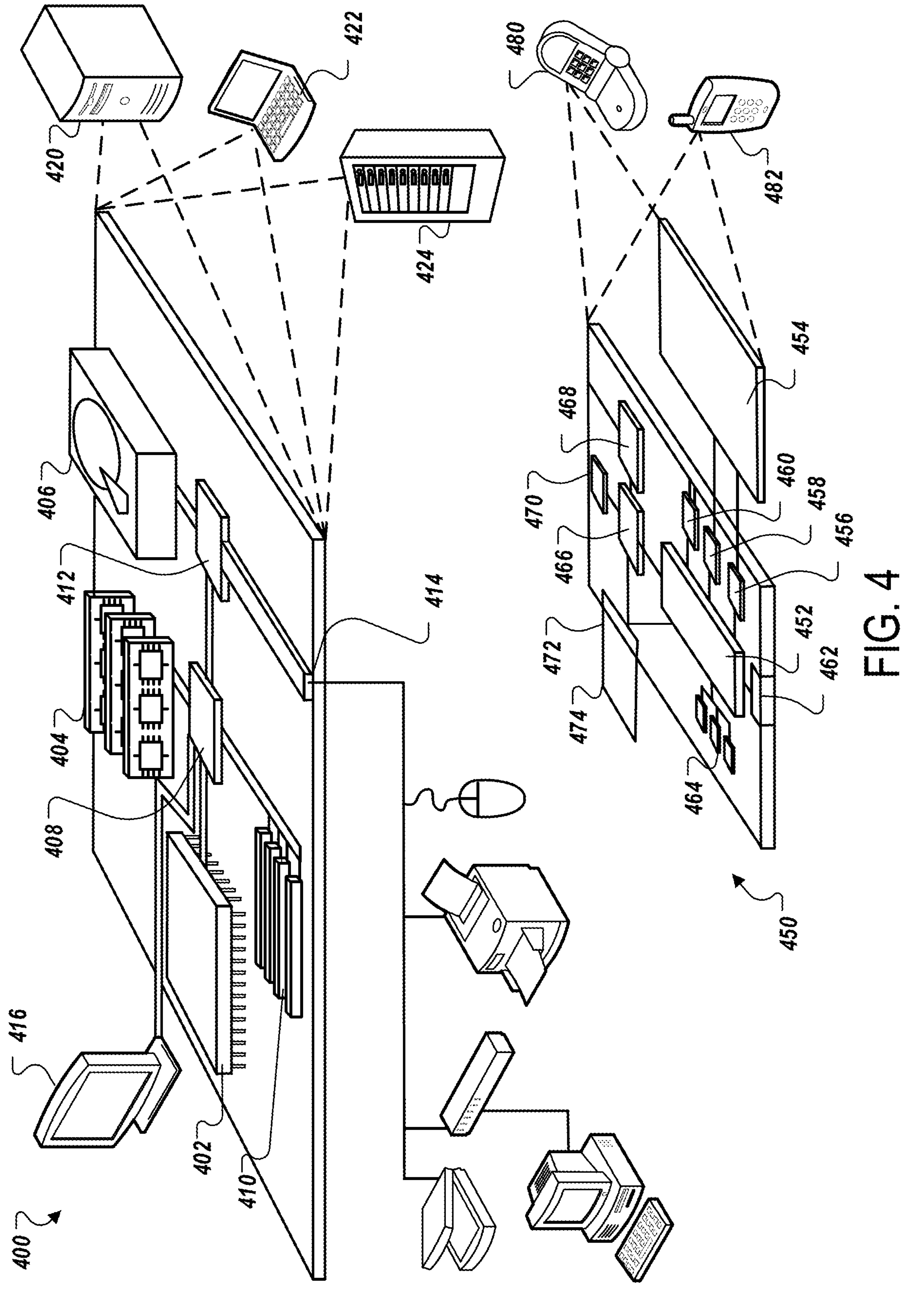
FIG. 4 is a diagram illustrating an example of a computing system used for resistant memory operation.

FIG. 3A is a flow diagram illustrating an example of a process 300A for resistant memory operation. The process 300 may be performed by one or more electronic systems, for example, the system 200 of FIG. 2. Operations of the process 300A are described below for illustration purposes only. Operations of the process 300A can be performed by any appropriate device or system, e.g., any appropriate data processing apparatus. Operations of the process 300A can also be implemented as instructions stored on a computer readable medium which may be non-transitory. Execution of the instructions causes one or more data processing apparatus to perform operations of the process 300A.

The process 300A includes accessing a buffer including one or more sets of bits (302A). For example, and as described with reference to FIG. 2, the operating device 202 accesses the buffer 206 from the memory storage 204. The memory storage 204 can be communicably connected to the operating device 202 are included in hardware of the operating device 202. The operating device 202 can read and write values from the buffer 206.

The process 300A includes generating a random sequence of values (304A). For example, and as described with reference to FIG. 2, the random number engine 214 generates values 216. The random number engine 214 can use a pseudo random generation algorithm where all values can be represented as indices of data in the buffer 206 or as indices of data not in the buffer 206. Using modulo functions, probing methods—e.g., linear probing, quadratic probing with a secret key offset, among other probing methods—the random number engine 214 can generate the values 216 that can be used to generate a sequence of indices where all data of the buffer 206 is operated on at least once but potentially more than once and operations can include decoy operations that do not operate on data of the buffer 206 but serve to obfuscate the power or timing operations of the operating device 202 to improve security.

In some implementations, generating the random sequence of values includes obtaining a value from entropy delivery hardware. For example, the process 300A can include obtaining a value from entropy delivery hardware and generating values from a number generator with the value from the entropy delivery hardware as a starting key. Entropy delivery hardware can include a particular hardware element that is configured to obtain one or more input values or a random value request and generate random values based on the input values or request. In some implementations, entropy delivery hardware uses variance in physical phenomena to generate random values. For example, variance in fan noise, hard disk drive, mouse clicking or movement, among others can be used as input for a entropy delivery hardware to generate one or more random values—e.g., at least one random value as a starting key to generate the random sequence of values. A starting key can be used—e.g., by the random number engine 214—as a starting value for a probing method or other pseudo random generation of subsequent values for the random sequence of values. Pseudo random generation can be configured to generate values corresponding to all indices of a buffer at least once—e.g., using modulo operators, quadratic computation, among others.

In some implementations, the process 300A includes providing one or more requirements to a number generator, where the one or more requirements include one or more values representing portions of the buffer. For example, the operating device 202 can provide one or more requirements to the random number engine 214 or the operating engine 220. The one or more requirements can include a size of one or more buffers—e.g., the buffer 206 among other buffers. The size can be used for one or more modulo operations to determine indices to be used for operations performed by the operating engine 220. For example, a modulo value can be used to constrain a number of indices generated by the operating engine 220 based on random numbers generated by the random number engine 214 into a region that includes data within the buffer 206 or a region that includes data within the buffer 206 and other portions of the buffer 206 or other buffers to allow for decoy operations for those other portions.

The process 300A includes generating a sequence of indices representing an order in which to access particular sets of bits of the buffer (306A). For example, and as described with reference to FIG. 2, the operating engine 220 can use the values 216 generated by the random number engine 214 to determine one or more indices. The operating engine 220 can generate an index using a value of the values 216 as an offset from a predetermined value—e.g., a starting offset in memory location for the buffer 206—among other index generation algorithms.

In some implementations, the sequence of indices can be equal to the random values generated by a random number generator. For example, the random number engine 214 can be configured—e.g., by the operating device 202—to output values that can be used directly as indices by the operating engine 220. Indices can include locations in memory corresponding to the buffer 206.

The process 300A includes accessing a set of the particular sets of bits of the buffer at an index in the order of the sequence of indices (308A). For example, and as described with reference to FIG. 2, each index of indices generated by the operating engine 220 can correspond to a particular portion of the buffer 206 or a portion of data not in the buffer 206, or other value not indicative of data in the buffer 206. For indices corresponding to portions of data in the buffer 206, the operating engine 220 can access those portions at a time given by the order of the indices generated based on the order of the random values 216. For other indices, the operating engine 220 can access data not in the buffer 206—e.g., unused data adjacent to the buffer 206 or in other memory storage—or not access data but perform decoy operations.

As discussed, only some indices may correspond to data in the buffer 206. The operating device 202 can determine, before accessing or performing operations, whether or not to perform a decoy operation or actual memory operation based on the corresponding index and a known one or more values of indices that correspond to the buffer 206. The operating device 202 can also attempt to access the buffer 206 using an index and, if not successful, can determine that the index does not correspond to data of the buffer 206. Information of what indices are acceptable can also be determined without trying to access the buffer 206 at a given index by determining a size of the buffer 206 and a number of bits corresponding to each index—e.g., a buffer of size 1600 bits that includes 50 words where each word has a corresponding index, indices outside of 0-49 or 1-50 (or corresponding ranges with an applied memory location offset) can be determined as not corresponding to data of the buffer 206.

In some implementations, accessing a set of the particular sets of bits of the buffer at an index in the order of the sequence of indices occurs in response to determining an index of the sequence of indices corresponds to a location in the buffer. For example, if the operating device 202 determines a given index does not correspond to a location in the buffer 206, the operating device 202 can perform a decoy operation as discussed. If the operating device 202 determines a given index does correspond to a location in the buffer 206, the operating device 202 can perform a memory operation—e.g., copying, resetting, or comparing.

The process 300A includes performing one or more memory operations on the set of the one or more sets of bits after accessing the set (310A). For example, and as described with reference to FIG. 2, the operating engine 220 can perform operations 222, 224, and 226, where the operation 226 is a decoy operation based on the corresponding random value producing an index that does not correspond to data in the buffer 206. However, for a hacker observing the computation of the operating device 202, the decoy operation 226 may appear similar to the operations 222 and 224 thereby partially obfuscating the operations of the operating device 202. The operations 222 and 224 can include copying bits to or from the buffer 206, comparing bits in the buffer 206 to bits of one or more other buffers, or resetting one or more bits of the buffer 206. The operations 222 and 224 can include operating on particular portions of the buffer 206 corresponding to indices generated based on the random values "892" and "2" respectively. The random values 216 are shown for illustration purposes and can, in general, be any values.

In some implementations, decoy operations can include copying or comparing already copied or compared elements of one or more buffers. For example, for a given index not associated with a portion of the buffer 206, the operating engine 220 can perform a decoy operation such as copying or comparing already copied or compared elements of the buffer 206 or other buffer—e.g., a buffer being compared with the buffer 206. For resetting operations, the decoy operation can include resetting already reset portions of the buffer 206 or other buffer. The operating engine 220 can perform operations such as copying, resetting, or comparing already copied, reset, or compared elements of one or more buffers when generated indices are repeated—e.g., representing the same portion of the buffer 206 or other buffer. In general, this may help obfuscate a power or timing profile of the processing performed by the operating device 202.

The following shows example code description that can be used to implement techniques described in this document:

```
These functions can be used to traverse buffers in random
order to thwart traditional power-analysis attacks among other attacks, making the
aggregate behavior of calls to this function appear as if their power usage has
minimal dependency on the input.
---
```

-continued

```
sw/device/lib/base/hardened_memory.c | 178
++++++++++++++++++++++++++++
sw/device/lib/base/hardened_memory.h | 88 +++++++++++++
sw/device/lib/base/meson.build | 12 ++
3 files changed, 278 insertions (+)
create mode 100644 sw/device/lib/base/hardened_memory.c
create mode 100644 sw/device/lib/base/hardened_memory.h
diff --git a/sw/device/lib/base/hardened_memory.c
b/sw/device/lib/base/hardened_memory.c
new file mode 100644
index 000000000..8b44a6893
--- /dev/null
+++ b/sw/device/lib/base/hardened_memory.c
@@ −0,0 +1,178 @@
+#include "sw/device/lib/base/hardened_memory.h"
+
+#include "sw/device/lib/base/memory.h"
+#include "sw/device/lib/base/random_order.h"
+
+// NOTE: The three hardened_mem* functions have similar contents, but
the parts that are shared between them are commented only in 'memcpy( )'.
+void hardened_memcpy(uint32_t *restrict dest, const uint32_t
*restrict src,
+ size_t word_len) {
+ random_order_t order;
+ random_order_init(&order, word_len);
+
+ size_t count = 0;
+ size_t expected_count = random_order_len(&order);
+
+ // Immediately convert 'src' and 'dest' to addresses, which erases
their provenance and causes their addresses to be exposed (in the
provenance sense) .
+ uintptr_t src_addr = (uintptr_t)src;
+ uintptr_t dest_addr = (uintptr_t)dest;
+
+ // 'decoys' can be a small stack array that is filled with
uninitialized memory. It is scratch space for us to do "extra" operations, when
the
the number of iteration indices the chosen random order is different from
'words'.
+ //
+ // These extra operations also introduce noise that an attacker
must do work to filter, such as by applying side-channel analysis to obtain
an address trace.
+ uint32_t decoys[8];
+ uintptr_t decoy_addr = (uintptr_t)&decoys;
+
+ // We can launder 'count', so that the SW.LOOP-COMPLETION check
is not deleted by the compiler.
+ for (; count < expected_count; count = launderw(count)) {
+ // The order values themselves are in units of words, but we need
'idx' to be in units of bytes.
+ // The value obtained from 'advance( )' is laundered, to prevent implementation
details from leaking across procedures.
+ size_t idx = launderw(random_order_advance(&order)) *
sizeof(uint32_t);
+
+ // Prevent the compiler from reordering the loop; this can ensure a happens-
before among indices consistent with 'order'.
+ barrierw(idx);
+
+ // Compute putative offsets into 'src', 'dest' , and 'decoys'. Some of these may
go off the end of 'src' and 'dest', but, in some cases, they may not be cast to
pointers. (Note that casting out-of-range can address to pointers is UB.)
+ uintptr_t srcp = src_addr + idx;
+ uintptr_t destp = dest_addr + idx;
+ uintptr_t decoy1 = decoy_addr + (idx & 7);
+ uintptr_t decoy2 = decoy_addr + ((idx + 4) & 7);
+
+ // Branchlessly select whether to do a "real" copy or a decoy copy, depending on
whether we've gone off the end of the array or not.
+ // Pretty much everything can be laundered: we can launder 'idx' for obvious
reasons, and can launder the result of the select, so that the compiler does not
delete resulting loads and stores. This is similar to having used 'volatile
uint32_t *'.
+ void *src = (void *) launderw(
+ ct_cmovw(ct_sltuw(launderw(idx), word_len), srcp, decoy1));
+ void *dest = (void *)launderw(
```

-continued

```
+ ct_cmovw(ct_sltuw(launderw(idx), word_len), destp, decoy2));
+
+ // Perform the copy, without performing a typed dereference operation.
+ write_32(read_32(src), dest);
+ }
+
+ // No need to launder here; it's the final use of 'count', which
has been laundered above. This ensures that we have traversed the entire
random order sequence. CHECK (count == expected_count);
+}
+
+// TODO: This needs to be wired up.
+static uint32_t random_word(void) { return 0xcaffe17e; }
+
+void hardened_memshred(uint32_t *dest, size_t word_len) {
+ random_order_t order;
+ random_order_init(&order, word_len);
+
+ size_t count = 0;
+ size_t expected_count = random_order_len(&order);
+
+ uintptr_t data_addr = (uintptr_t)dest;
+
+ uint32_t decoys[8];
+ uintptr_t decoy_addr = (uintptr_t)&decoys;
+
+ for (; count < expected_count; count = launderw(count)) {
+ size_t idx = launderw(random_order_advance(&order)) * 4;
+ barrierw(idx);
+
+ uintptr_t datap = data_addr + idx;
+ uintptr_t decoy = decoy_addr + (idx & 7);
+
+ void *data = (void *)launderw(
+ ct_cmovw(ct_sltuw(launderw(idx), word_len), datap, decoy));
+
+ // Write a freshly-generated random word to '*data'.
+ write_32(random_word( ), data);
+ }
+
+ // CHECK(count == expected_count);
+}
+
+hardened_bool_t hardened_memeq(const uint32_t *lhs, const uint32_t
*rhs,
+ size_t word_len) {
+ random_order_t order;
+ random_order_init(&order, word_len);
+
+ size_t count = 0;
+ size_t expected_count = random_order_len(&order);
+
+ uintptr_t a_addr = (uintptr_t)lhs;
+ uintptr_t b_addr = (uintptr_t)rhs;
+
+ // 'decoys' can be filled with equal values this time around. It should be
filled with values with a Hamming weight of around 16, which is the most common
hamming weight among 32-bit words.
+ uint32_t decoys[8] = {
+ 0xaaaaaaaa, 0xaaaaaaaa, 0xaaaaaaaa, 0xaaaaaaaa,
+ 0xaaaaaaaa, 0xaaaaaaaa, 0xaaaaaaaa, 0xaaaaaaaa,
+ };
+ uintptr_t decoy_addr = (uintptr_t) &decoys;
+
+ uint32_t zeros = 0;
+ uint32_t ones = UINT32_MAX;
+
+ // The loop is almost token-for-token the one above, but the copy
is replaced with something else.
+ for (; count < expected_count; count = launderw(count)) {
+ size_t idx = launderw(random_order_advance(&order)) * 4;
+ barrierw(idx);
+
+ uintptr_t ap = a_addr + idx;
+ uintptr_t bp = b_addr + idx;
+ uintptr_t decoy1 = decoy_addr + (idx & 7);
+ uintptr_t decoy2 = decoy_addr + ((idx + 4) & 7);
+
+ void *av = (void *)launderw(
```

-continued

```
+ ct_cmovw(ct_sltuw(launderw(idx) , word_len), ap, decoy1));
+ void *bv = (void *)launderw(
+ ct_cmovw(ct_sltuw(launderw(idx), word_len), bp, decoy2));
+
+ uint32_t a = read_32(av);
+ uint32_t b = read_32(bv);
+
+ // Launder one of the operands, so that the compiler cannot cache
the result of the xor for use in the next operation.
+ //
+ // We launder 'zeroes' so that compiler cannot learn that
'zeroes' has strictly more bits set at the end of the loop.
+ zeros = launder32(zeros) | (launder32(a) ^ b);
+
+ // Same as above. The compiler can cache the value of 'a[offset]', but it has no
chance to strength-reduce this operation.
+ ones = launder32(ones) & (launder32(a) ^ ~b);
+ }
+
+ // NOTE (moidx): shuffled_memcmp from #6924 has a better method to ensure that
all the addresses where traversed.
+
+ // CHECK (count == expected_count);
+ if (launder32(zeros) == 0) {
+ // CHECK (launder(ones) == UINT32_MAX);
+ return kHardenedBoolTrue;
+ }
+
+ // Optional? CHECK(launder(ones) != UINT32_MAX);
+ return kHardenedBoolFalse;
+}
diff --git a/sw/device/lib/base/hardened_memory.h
b/sw/device/lib/base/hardened_memory.h
new file mode 100644
index 000000000..b45d13d6b
--- /dev/null
+++ b/sw/device/lib/base/hardened_memory.h
@@ -0,0 +1,88 @@
+#ifndef OPENTITAN_SW_DEVICE_LIB_BASE_HARDENED_MEMORY_H_
+#define OPENTITAN_SW_DEVICE_LIB_BASE_HARDENED_MEMORY_H_
+
+/**
+ * @file
+ * @@brief Hardened memory operations for constant power buffer
manipulation.
+ */
+
+#include <stddef.h>
+#include <stdint.h>
+
+#include "sw/device/lib/base/hardened.h"
+
+#ifdef __cplusplus
+extern "C" {
+#endif // __cplusplus
```

Memory Copy Operation

```
+/**
+ * Copies 32-bit words between non-overlapping regions.
+ * Unlike 'memcpy( )', this function has important differences:
+ * - It may be slower than non-secured memory operations, since it mitigates
power-analysis attacks.
+ * - It can performs operations on 32-bit words, among other sizes. It can also
perform operations on bytes.
+ * - It can return void.
+ *
+ * For the example code, input pointers *MUST* be 32-bit aligned, although they
do not need to actually point to memory declared as 'uint32_t' per the C aliasing
rules. However, other sizes of bits can be used by varying the expected size of
bits in the above sample code.
+ * Internally, this function is careful to not dereference its
operands directly, and instead uses dedicated load/store intrinsics.
+ *
+ * @param dest The destination of the copy.
```

-continued

```
+ * @param src The source of the copy.
+ * @param word_len The number of words to copy.
+ */
+void hardened_memcpy(uint32_t *restrict dest, const uint32_t
*restrict src,
+ size_t word_len);
```

```
+/**
+ * Fills a 32-bit aligned region of memory with random data.
+ *
+ * Unlike 'memset( )', this function has important differences:
+ * - It can be slower than unsecured memory operations, since it mitigates power-
analysis attacks.
+ * - It performs operations on 32-bit words, rather than bytes but this size can
change depending on implementations of the above sample code.
+ * - The sample code does not allow for fill value to be specified but other
implementations of the sample code may include the ability to obtain a fill value
and use that for memory setting.
+ * - It returns void.
+ *
+ * For the example code, input pointers *MUST* be 32-bit aligned, although they
do not need to actually point to memory declared as 'uint32_t' per the C aliasing
rules. However, other sizes of bits can be used by varying the expected size of
bits in the above sample code.
+ * Internally, this function is careful to not dereference its
operands directly, and instead uses dedicated load/store intrinsics.
+ *
+ * @param dest The destination of the set.
+ * @param word_len The number of words to write.
+ */
+void hardened_memset(uint32_t *dest, uint32_t value, size_t
word_len);
+
```

```
+/**
+ * Compare two potentially-overlapping 32-bit aligned regions of
memory for
+ * equality.
+ *
+ * Unlike 'memcmp( )', this function has important differences:
+ * - It is significantly slower, since it mitigates power-analysis
attacks.
+ * - It performs operations on 32-bit words, rather than bytes but this size can
change depending on implementations of the above sample code.
+ * - It only computes equality, not lexicographic ordering, which
would be even slower. Some implementations can include this feature.
+ * - It returns a 'hardened_bool t'.
+ *
+ * For the example code, input pointers *MUST* be 32-bit aligned, although they
do not need to actually point to memory declared as 'uint32_t' per the C aliasing
rules. However, other sizes of bits can be used by varying the expected size of
bits in the above sample code.
+ * Internally, this function is careful to not dereference its
operands directly, and instead uses dedicated load/store intrinsics.
+ *
+ * @param lhs The first buffer to compare.
+ * @param rhs The second buffer to compare.
+ * @param word_len The number of words to write.
+ */
+hardened_bool_t hardened_memeq(const uint32_t *lhs, const uint32_t
*rhs,
+ size_t word_len);
+
+#ifdef __ cplusplus
+} // extern "C"
+#endif // __cplusplus
+
```

This specification generally describes memory operations that can be implemented as computer programs on one or more computers in one or more locations.

Three memory operations are defined in this specification. They achieve a similar purpose to memcpy, memcmp, and memset, while being resistant to fault and power attacks, and being portable to new platforms under modest assumptions.

In some implementations, the memory operations described in this document have signatures as shown below:

void hardened_memcpy(uint32_t*dest, const uint32_t*src, size_t words);

hardened_bool_t hardened_memeq(const uint32_t*a, const uint32_*b, size_t words);

void hardened_memshred(uint32_t*dest, size_t words);

Some example features in some implementations of the aforementioned signatures are described as follows.

hardened_memcpy and hardened_memshred now return void, rather than a pointer.

Arguments in the three memory operations can include pointers to 32-bit-aligned buffers of words.

Lengths in the three memory operations can be given in words, not bytes.

hardened_memeq can include compares for equality, not lexicographic order.

Hardened_memshred can fill the destination with random data.

Some of the primitives in the implementation of these operations are described as follows. Operations described can be performed by the system 200 shown in FIG. 2, including the operating device 202.

A value barrier, denoted herein as launder (x), acts as a barrier for what information the compiler can learn about 'x'. It prevents the compiler from learning that a value is zero, or increments monotonically, inhibiting undesired reordering or code folding optimizations.

A purity barrier, denoted herein as barrier (x), acts as a barrier for the compiler's side-effect analysis. The compiler must assume that the value of 'x' in that moment in time, with respect to all other barrier (x) calls, is externally observed. This prevents certain undesirable reordering optimizations.

Constant-time select. Given word-sized integers a, b, c, and d, 'a>b?c: d' and 'a==b?c: d' can be computed without resorting to branch instructions.

A pseudo-random iteration sequence (PRIS) generator, such as the random number engine 214 described in reference to FIG. 2. Given a value N, the generator can output a pseudo-random sequence of integers s (i) of length M>=N such that for all 0<=n<N, there is at least one j such that s (j)=n. The sequence visits all numbers from 0 to N at least once, and possibly others, too. In the example of FIG. 2, all numbers from 0 to N can include all sets of bits included in the buffer 206. A pseudo-random uniform bit generator.

Figure 3B:
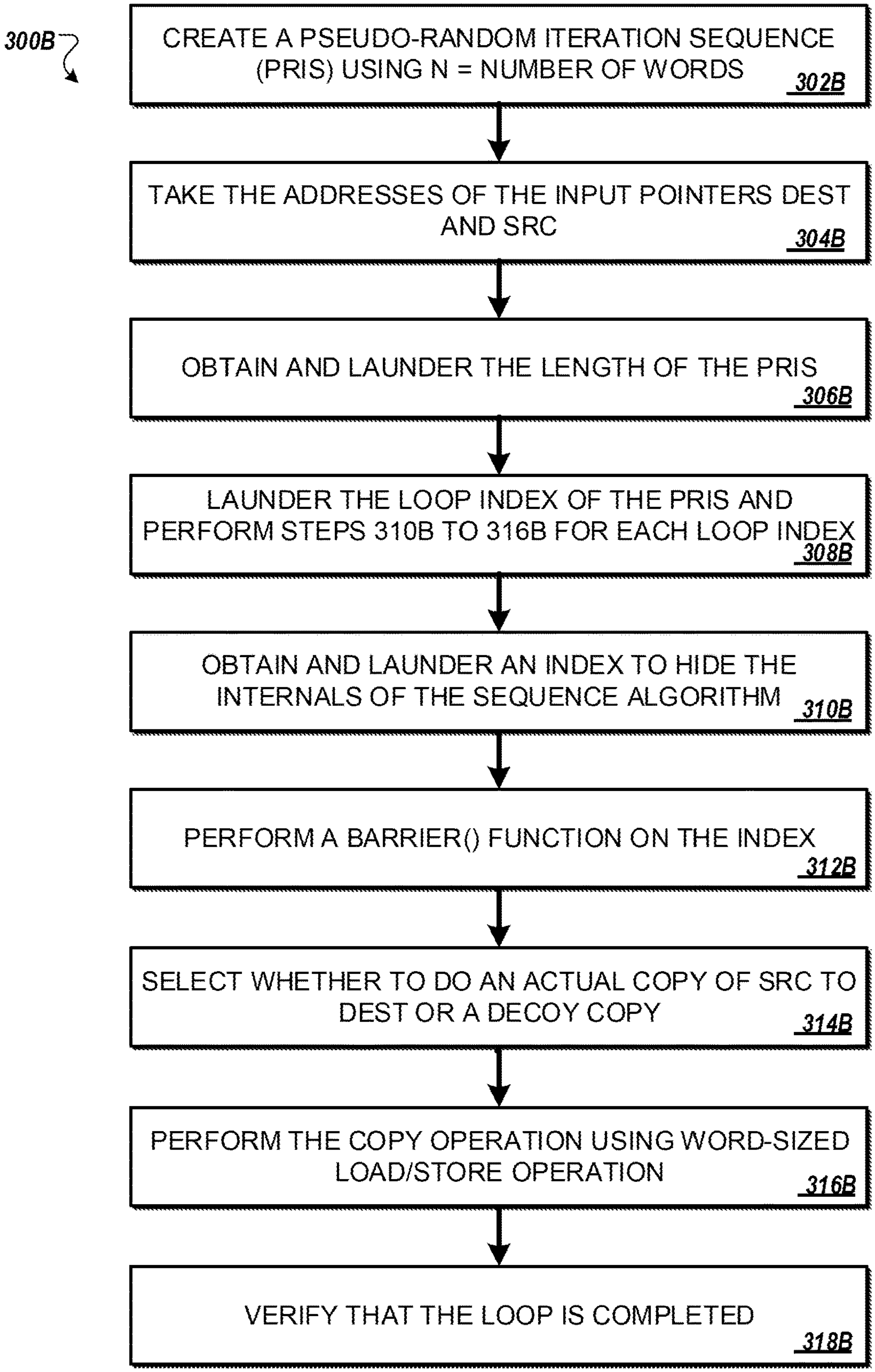
FIG. 3B is a flow diagram illustrating an example of a process for an example resistant memory operation of copying data.

An example flowchart for implementing hardened-memcpy is illustrated in FIG. 3B and further described below. Additional details of this and the other hardened functions are described and depicted with reference to the section of pseudocode included in this document.

To implement hardened_memcpy, first a PRIS is created using N=# of words. An array of 2^k (k is relatively small, for example, k=3) decoy words is also allocated on the stack.

After taking the addresses of the input pointers dest and src, an example PRIS can be generated in C-like pseudocode as follows.

seq s=make_sequence (words);

Next the length of the sequence is obtained and laundered to prevent loop optimizations that take account a known relation between 'words' and 'length' (i.e. 'length=words*2') specific to the PRIS generator's algorithm. An example in C-like pseudocode is shown below.

```
size_t length = launder(s.length( ));
size_t i;
uint32_t decoys[DECOY_N];
```

The loop index i is laundered to prevent a given compiler, such as a compiler of the operating device 202 shown in FIG. 2, from noticing that the loop is a monotonic loop. An example in C-like pseudocode is shown below.

for (i=0; i<length; i=launder (i+1)) {

An index, denoted herein as idx, is obtained next and laundered to hide the internals of the sequence algorithm as described above. A barrier( ) function is then performed on idx to ensure that the iteration steps occur in the precise order dictated, since the barrier( ) cannot be mutually reordered. An example in C-like pseudocode is shown below.

```
size_t idx = launder(s.next( ));
barrier(idx);
```

Next, in an example of a copying memory operation, branchlessly select whether to do an actual copy of src to dest or a decoy copy, depending on whether idx exceeds the size of the sequence. An example in C-like pseudocode is shown below.

```
uint32_t* from = idx <= words ? &src[idx] : &decoys[idx % DECOY_N];
uint32_t* to = idx <= words ? &dest[idx] : &decoys[(idx * 3) % DECOY_N];
```

Word-sized load/store can be used to perform the copy, without performing a typed dereference operation, in order to increase width of the hamming weight (HW) model distribution. An example in C-like pseudocode is shown below.

```
*to = * from;
}
```

As a fault-injection-protection measure, a verification that the loop actually completed is performed next.

The index idx can be laundered to prevent the compiler from identifying idx as being equal to length in the abstract machine model. An example in C-like pseudocode is shown below.

CHECK (launder (idx)==length);

hardened_memshred is identical to hardened-memcpy, except that calculation of *from above is replaced with a call to the uniform bit generator to produce a random 32-bit integer or a set of 0s.

hardened_memeq is a variation on the traditional constant-time memory comparison. An example in C-like pseudocode is shown below.

```
seq s = make_sequence(words);
size_t length = launder(s.length( ));
size_t i;
uint32_t zeros = 0; uint32_t ones = ~0;
```

Decoys must all be the same value now, for example, a high-weight constant that does not stand out in a hamming weight analysis. An example in C-like pseudocode is shown below.

```
uint32_t decoys[DECOY_N] = {kHighWeight, ...};
for (i = 0; i < length; i = launder(i + 1)) {
size_t idx = launder(s.next( ));
barrier(idx);
uint32_t* ap = idx <= words ? &src[idx] : &decoys[idx % DECOY_N];
uint32_t* bp = idx <= words ? &dest[idx] : &decoys[(idx * 3) % DECOY_N];
uint32_t a = * ap;
uint32_t b = * bp;
```

Next, both (i) the OR of all XORs of a and b and (ii) the AND of all XNORs are accumulated. If the two buffers are equal, these will both be exactly zero and all-ones at the end of the loop; if they are both not equal, neither will be zero or all ones, respectively. The remaining two possibilities (one equals the expected value, the other does not) are an unlikely condition that can be used to try and detect tampering. An example in C-like pseudocode is shown below.

```
zeros = launder(zeros) | (launder(a) ^ b);
ones = launder(ones) & (launder(a) ^ ~b);
}
```

In addition to checking whether the loop is completed, an extra check can be performed, leveraging the aforementioned properties of the variables zeros and ones, to catch tampering. An example in C-like pseudocode is shown below.

```
CHECK(launder(i) == length);
if (zeros != 0) {
CHECK(ones != -1);
return false;
} else {
CHECK(ones== -1);
return true;
```

This specification uses the term “configured” in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term “data processing apparatus” refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term “engine” is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers. In some implementations, an engine includes one or more processors that can be assigned exclusively to that engine, or shared with other engines.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

FIG. 4 is a diagram illustrating an example of a computing system used for resistant memory operation. The computing system includes computing device 400 and a mobile computing device 450 that can be used to implement the techniques described herein. For example, one or more components of the system 100 could be an example of the computing device 400 or the mobile computing device 450, such as a computer system implementing the operating device 202, devices that access information from the operating device 202, or a storage unit—such as the memory storage 204—that accesses or stores information regarding the operations performed by the operating device 202.

The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 402 is a single threaded processor. In some implementations, the processor 402 is a multi-threaded processor. In some implementations, the processor 402 is a quantum computer.

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine readable mediums (for example, the memory 404, the storage device 406, or memory on the processor 402). The high-speed interface 408 manages bandwidth-intensive operations for the computing device 400, while the low-speed interface 412 manages lower bandwidth-intensive operations. Such allocation of functions is an example only. In some implementations, the high speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may include one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry in some cases. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 468 using a radio frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, among others) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term “data processing apparatus” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:

accessing a buffer of a memory device, the buffer including one or more sets of bits;

generating a random sequence of values;

generating, from the random sequence of values, a sequence of indices representing an order in which to access particular sets of bits of the buffer;

in response to determining that an index of the sequence of indices corresponds to a location in the buffer associated with a set of the particular sets of bits, accessing the set of the particular sets of bits of the buffer at the index in the order of the sequence of indices;

performing one or more memory operations on the set of the particular sets of bits after accessing the set;

determining that a second index of the sequence of indices does not correspond to a location in the buffer; and in response to determining that a second index of the sequence of indices does not correspond to a location in the buffer, performing a decoy operation on one or more second bits of the memory device.

2. The method of claim 1, wherein generating the random sequence of values comprises:

obtaining a value from entropy delivery hardware; and generating values from a number generator with the value from the entropy delivery hardware as a starting key.

3. The method of claim 2, further comprising:

providing one or more requirements to the number generator, wherein the one or more requirements include one or more values representing portions of the buffer.

4. The method of claim 1, wherein generating the sequence of indices from the random sequence of values representing the order in which to access particular sets of the one or more sets of bits of the buffer comprises:

adding a value of the random sequence of values to a memory offset value corresponding to a starting memory location of the buffer.

5. The method of claim 1, wherein performing one or more memory operations comprises:

copying bits to, or from, the buffer.

6. The method of claim 1, wherein performing one or more memory operations comprises:

resetting bits in the buffer to random or 0 bits.

7. The method of claim 1, wherein performing one or more memory operations comprises:

comparing bits of the buffer to bits of a second buffer.

8. The method of claim 7, further comprising:

accessing the second buffer including one or more sets of bits; and accessing a second set of bits of the second buffer in the order of the sequence of indices.

9. The method of claim 1, wherein accessing the set of the particular sets of bits of the buffer at the index in the order of the sequence of indices comprises:

accessing a portion of the buffer corresponding to the index, wherein the portion includes the set of the particular sets of bits.

10. The method of claim 1, wherein determining the index of the sequence of indices corresponds to a location in the buffer comprises:

determining the index of the sequence of indices corresponds to the set of the particular sets of bits of the buffer.

11. The method of claim 1, wherein the decoy operation comprises one or more of: copying existing memory values to the same memory location or moving unused memory bits by one or more bits in memory.

12. A non-transitory computer-readable medium storing one or more instructions that, when executed by a data processing apparatus, cause the data processing apparatus to perform operations comprising:

accessing a buffer of a memory device, the buffer including one or more sets of bits;

generating a random sequence of values;

generating, from the random sequence of values, a sequence of indices representing an order in which to access particular sets of bits of the buffer;

in response to determining that an index of the sequence of indices corresponds to a location in the buffer associated with a set of the particular sets of bits, accessing the set of the particular sets of bits of the buffer at the index in the order of the sequence of indices;

performing one or more memory operations on the set of the particular sets of bits after accessing the set;

determining that a second index of the sequence of indices does not correspond to a location in the buffer; and in response to determining that a second index of the sequence of indices does not correspond to a location in the buffer, performing a decoy operation on one or more second bits of the memory device.

13. The medium of claim 12, wherein generating the random sequence of values comprises:

obtaining a value from entropy delivery hardware; and generating values from a number generator with the value from the entropy delivery hardware as a starting key.

14. The medium of claim 13, wherein the operations comprise:

providing one or more requirements to the number generator, wherein the one or more requirements include one or more values representing portions of the buffer.

15. The medium of claim 12, wherein generating the sequence of indices from the random sequence of values representing the order in which to access particular sets of the one or more sets of bits of the buffer comprises:

adding a value of the random sequence of values to a memory offset value corresponding to a starting memory location of the buffer.

16. The medium of claim 12, wherein performing one or more memory operations comprises: copying bits to, or from, the buffer.

17. The medium of claim 12, wherein performing one or more memory operations comprises: resetting bits in the buffer to random or 0 bits.

18. The medium of claim 12, wherein performing one or more memory operations comprises: comparing bits of the buffer to bits of a second buffer.

19. A system, comprising:

one or more computers; and one or more storage devices on which are stored instructions that are operable, when executed by the one or more computers, to cause the one or more computers to perform operations comprising:

accessing a buffer of a memory device, the buffer including one or more sets of bits;

generating a random sequence of values;

generating, from the random sequence of values, a sequence of indices representing an order in which to access particular sets of bits of the buffer;

in response to determining that an index of the sequence of indices corresponds to a location in the buffer associated with a set of the particular sets of bits, accessing the set of the particular sets of bits of the buffer at the index in the order of the sequence of indices;

performing one or more memory operations on the set of the particular sets of bits after accessing the set;

determining that a second index of the sequence of indices does not correspond to a location in the buffer; and in response to determining that a second index of the sequence of indices does not correspond to a location in the buffer, performing a decoy operation on one or more second bits of the memory device.

* * * * *